United States Patent
Gavrilov et al.

(10) Patent No.: US 6,329,789 B1
(45) Date of Patent: Dec. 11, 2001

(54) METHODS OF CHARGING LITHIUM-SULFUR BATTERIES

(75) Inventors: Alexei B. Gavrilov, Fairport, NY (US); Yuriy V. Mikhaylik, Tucson, AZ (US)

(73) Assignee: Moltech Corporation, Tucson, AZ (US)

(*) Notice: Subject to any disclaimer, the term of this patent is extended or adjusted under 35 U.S.C. 154(b) by 0 days.

(21) Appl. No.: 09/469,736

(22) Filed: Dec. 21, 1999

(51) Int. Cl.[7] .................................. H02J 7/00; H02J 7/04
(52) U.S. Cl. ..................... 320/125; 320/128; 320/130; 320/160
(58) Field of Search ..................... 320/128, 130, 320/131, 160, 125

(56) References Cited

U.S. PATENT DOCUMENTS

| | | |
|---|---|---|
| 4,664,991 | 5/1987 | Perichaud et al. . |
| 4,739,018 | 4/1988 | Armand et al. . |
| 4,833,048 | 5/1989 | De Jonghe et al. . |
| 4,917,974 | 4/1990 | De Jonghe et al. . |
| 5,162,175 | 11/1992 | Visco et al. . |
| 5,194,341 | 3/1993 | Bagley et al. . |
| 5,324,599 | 6/1994 | Oyama et al. . |
| 5,500,583 | 3/1996 | Buckley et al. . |
| 5,516,598 | 5/1996 | Visco et al. . |
| 5,529,860 | 6/1996 | Skotheim et al. . |
| 5,538,812 | 7/1996 | Lee et al. . |
| 5,550,454 | 8/1996 | Buckley . |
| 5,601,947 | 2/1997 | Skotheim et al. . |
| 5,690,702 | 11/1997 | Skotheim et al. . |
| 5,723,230 | 3/1998 | Naoi et al. . |
| 5,783,330 | 7/1998 | Naoi et al. . |
| 5,792,575 | 8/1998 | Naoi et al. . |
| 5,882,819 | 3/1999 | Naoi et al. . |
| 5,900,718 | 5/1999 | Tsenter . |
| 5,935,724 | 8/1999 | Spillman et al. . |
| 5,935,728 | 8/1999 | Spillman et al. . |
| 6,204,364 | * 3/2001 | Zimmerman et al. ................ 320/128 |

FOREIGN PATENT DOCUMENTS

WO 99/33125    7/1999  (WO) .

OTHER PUBLICATIONS

Alamgir et al., "Room Temperature Polymer Electrolytes", *Industrial Chemistry Library, vol. 5, Lithium Batteries: New Materials, Developments and Perspectives*, Chapter 3, pp. 93–136, Elsevier, Amsterdam, 1994.

Aurbach et al., "The Correlation Between Charge/Discharge Rates and Morphology, Surface Chemistry, and Performance of Li Electrodes and the Connection to Cycle Life and Practical Batteries", *J. Electrochem. Soc.*, vol. 145, No. 5, pp. 1421–1426 (1998).

Dominey, "Current State of the Art on Lithium Battery Electrolytes", *Industrial Chemistry Library, vol. 5, Lithium Batteries: New Materials, Developments and Perspectives*, Chapter 4, pp. 137–165, Elsevier, Amsterdam, 1994.

Saito et al., "Specific Surface Area Measurement of Lithium Anode in Rechargeable Lithium Cells", *J. Power Sources*, vol. 72, pp. 111–117 (1998).

Tatsuma et al., "Dimercaptan–Polyaniline Cathodes for Lithium Batteries: Addition of a Polypyrrole Derivative for Rapid Charging", J. Electrochem. Soc., vol. 142, No. 10, pp. L182–L184 (1995).

* cited by examiner

*Primary Examiner*—Gregory J. Toatley, Jr.

(57) ABSTRACT

Provided is a method for increasing the cycle life of discharged lithium electrochemical cells, wherein the cell comprises (i) an anode comprising lithium; (ii) a cathode comprising an electroactive sulfur-containing material; and (iii) a liquid electrolyte interposed between the anode and cathode; wherein the method comprises the steps of: (a) charging the cell at an initial low rate of less than 0.2 mA/cm$^2$ to a cell voltage in the range of 2.1 to 2.3 V followed by (b) a subsequent high rate of greater than 0.2 mA/cm$^2$ to a cell voltage of at least 2.4 V.

24 Claims, 2 Drawing Sheets

METHODS OF CHARGING LITHIUM-SULFUR BATTERIES

TECHNICAL FIELD

The present invention generally relates to the field of electrochemical cells. More particularly, the invention pertains to lithium rechargeable cells comprising sulfur-containing cathode materials and to methods of recharging these cells to achieve long cycle life.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

The need for rechargeable batteries with long cycle life, rapid charge capacity, and high energy density for devices such as mobile telephones, portable computers and other consumer electronic devices continues to grow. Rechargeable batteries, such as those based on lithium metal anodes and solid electroactive sulfur-containing cathode active materials, provide one approach to meet this need. For example, U.S. Pat. Nos. 5,529,860, 5,601,947, and 5,690,702 to Skotheim et al., and U.S. Pat. Application Ser. No. 08/995,122 now U.S. Pat. No. 6,201,100 to Gorkovenko et al. of the common assignee, describe electroactive sulfur-containing cathode active materials and lithium/sulfur batteries using these sulfur-containing cathode active materials.

However, one problem encountered in electrochemical cells based on lithium and sulfur-containing cathode active materials is limited cycle life, i.e. the number of rechargings the battery can accept before the battery is no longer able to maintain acceptable levels of charge capacity, such as 50–80% of the initial capacity of the battery.

It has been shown that the charge conditions may directly affect the lithium surface morphology in recharging lithium secondary cells with lithium metal anodes and with transition metal oxide cathodes. It is believed that lithium surface morphology created in the lithium deposition process is one important factor in determining cycle life. For example, Aurbach et al., in *J. Electrochem. Soc.*, 1988, 145, 1421–1426, report a much lower cycle life for Li—Li$_x$MnO$_2$ cells, with lithium metal anodes under fast charge rates (1.25 mA/cm$^2$) compared with slow charge rates (0.3 mA/cm$^2$).

It has also been shown that discharge rates may affect the cycle life of rechargeable batteries. For example, it has been reported that high discharge rates for lithium cells result in longer cycle life than low discharge rates. For example, Saito et al. report, in *J. Power Sources*, 1998, 72, 111–117, that for LiNV$_2$O$_5$—P$_2$O$_5$ cells, low rate discharging (0.5 mA/cm$^2$ results in a higher surface area for a lithium metal anode and in much lower cycle life than high rate discharging (5.0 mA/cm$^2$).

Cathode performance, at the same time, may also be diminished by application of high charge rates in comparison to lower rates of charge. For example, Tatsuma et al. in *J. Electrochem. Soc.*, 1995, 142, L182–L1 84, report that shorter cycle life is achieved when high charge rates, 0.2 mA/cm$^2$, are used for polyaniline/dimercaptothiadiazole polymer composite cathodes when compared with low charge rates, 0.05 mA/cm$^2$.

Thus in general, these reports indicate that cycle life for rechargeable lithium metal cells is increased by the use of high rates of discharge in conjunction with low rates of charge.

In U.S. Pat. No. 5,550,454 to Buckley charging methods for solid secondary lithium electrochemical cells are reported. Sequences of charging currents, each for a period of time, are applied to discharged lithium secondary cells which extend cycle life or reduce the overall charging time. In U.S. Pat. No. 5,500,583 to Buckley et al. is described a method of extending the cycle life of a solid secondary electrochemical cell by applying a short high magnitude discharge pulse during the charging process.

Charging regimes for nickel based rechargeable batteries, such as nickel-cadmium and nickel metal-hydride, are quite different. For example, in U.S. Pat. No. 5,900,718 to Tsenter, is described a battery charger and methods of charging nickel based batteries in which charging rates are adjusted in response to temperature or open circuit voltage values. There is also provided a summary of the various methods described for use in recharging nickel based batteries.

There is a need in rechargeable lithium metal batteries for both long cycle life and rapid charge times, and for charging methods that maximize the cycle life while shortening charge times. There is also a need for charging regimes designed for rechargeable batteries comprising sulfur-containing cathodes. The present invention addresses the need for rapid charge times while at the same time achieving long cycle life for rechargeable batteries comprising sulfur-containing cathodes.

SUMMARY OF THE INVENTION

The present invention pertains to a method of increasing the cycle life of a discharged lithium electrochemical cell, wherein the cell comprises (i) an anode comprising lithium; (ii) a cathode comprising an electroactive sulfur-containing material; and (iii) a liquid electrolyte interposed between the anode and the cathode, wherein the cell has been discharged at an overall current rate of less than 0.5 mA/cm$^2$; wherein the method comprises the steps of: (a) charging the cell at an initial low charge rate of less than 0.2 mA/cm$^2$ to a cell voltage in the range of 2.1 to 2.3 V; and (b) subsequently charging the cell at a high charge rate of greater than 0.2 mA/cm$^2$ to a cell voltage of at least 2.4 V.

In one embodiment, the low charge rate in the initial charging step (a) is from 0.03 mA/cm$^2$ to 0.15 mA/cm$^2$. In one embodiment, the high charge rate in the subsequent charging step (b) is from greater than 0.20 mA/cm$^2$ to 0.75 mA/cm$^2$.

In one embodiment, the initial low charge rate charging step (a) comprises two or more sub-steps of less than 0.2 mA/cm$^2$ in a sequence of increasing charge rate. In one embodiment, the subsequent high charge rate charging step (b) comprises two or more sub-steps of greater than 0.2 mA/cm$^2$ in a sequence of increasing charge rate.

In one embodiment, the cell is charged to a voltage of 2.2 to 2.3 V in the initial charging step (a).

In one embodiment, the combined sum of the charge provided in the initial charging step (a) and the subsequent charging step (b) is from 105% to 180% of the discharge capacity of the last half discharge cycle. In one embodiment, the combined sum of the charge provided in the initial charging step (a) and the subsequent charging step (b) is from 105% to 120% of the discharge capacity of the last half discharge cycle.

In one embodiment, the overall discharge rate of the cell is from 0.025 mA/cm$^2$ to 0.25 mA/cm$^2$.

In one embodiment, the electroactive sulfur-containing material comprises elemental sulfur. In one embodiment, the electroactive sulfur-containing material, in its oxidized state, comprises one or more polysulfide moieties, —$S_m$—, where m is an integer equal to or greater than 3. In one embodiment, the electroactive sulfur-containing material, in its oxidized state, comprises one or more polysulfide moieties, —$S_m^-$, where m is an integer equal to or greater than 3. In one embodiment, the electroactive sulfur-containing material, in its oxidized state, comprises one or more polysulfide moieties, $S_m^{2-}$, where m is an integer equal to or greater than 3.

In one embodiment, the electroactive sulfur-containing material, in its oxidized state, is of the general formula:

wherein x ranges from greater than 2.5 to about 50, and n is an integer equal to or greater than to 2.

In one embodiment, the electroactive sulfur-containing material, in its oxidized state, comprises one or more of the polysulfur moieties:

wherein m, the same or different at each occurrence, is an integer and is greater than 2, and y, the same or different at each occurrence, is an integer and is equal to or greater than 1.

In one embodiment, the electroactive sulfur-containing material, in its oxidized state, comprises one or more of the moieties:

wherein m is the same or different at each occurrence and is greater than 2.

In one embodiment, the electroactive sulfur-containing material is a polymer comprising polymeric segments of the formula;

wherein:

Q denotes a carbocyclic repeat unit comprising a carbocycle having from 3 to 12 ring carbon atoms;

S denotes a sulfur atom;

m is the number of sulfur atoms in a given polysulfide linkage, is an integer from 3 to 10, and is the same or different at each occurrence;

n denotes the number of crosslinking polysulfide linkages, is an integer from 1 to 20, and is the same or different at each occurrence; and p is an integer greater than 1.

In one embodiment, the electroactive sulfur-containing material comprises greater than 50% by weight of sulfur. In a preferred embodiment, the electroactive sulfur-containing material comprises greater than 75% by weight of sulfur. In a more preferred embodiment, the electroactive sulfur-containing material comprises greater than 90% by weight of sulfur.

In one embodiment, the anode comprises lithium metal.

In one embodiment, the electrolyte comprises: (i) one or more lithium salts; and (ii) one or more non-aqueous solvents.

In one embodiment, the one or more lithium salts are selected from the group consisting of LiBr, LiI, LiSCN, $LiBF_4$, $LiPF_6$, $LiAsF_6$, $LiSO_3CF_3$, $LiN(SO_2CF_3)_2$, $LiC(SO_2CF_3)_3$, $(LiS_x)_zR$, and $Li_2S_x$, where x is an integer from 1 to 20, z is an integer from 1 to 3, and R is an organic group.

In one embodiment, the one or more non-aqueous solvents are selected from the group consisting of ethers, cyclic ethers, polyethers, esters, sulfones, and sulfolanes.

As will be appreciated by one of skill in the art, features of one aspect or embodiment of the invention are also applicable to other aspects or embodiments of the invention.

DETAILED DESCRIPTION OF THE INVENTION

The present invention pertains to a discharged rechargeable electrochemical lithium cell and to methods for recharging the cell wherein the methods comprise the steps of (a) one or more low charge rate steps, and (b) after step (a) one or more high charge rate steps; wherein the cell comprises; (i) an anode comprising lithium; (ii) a cathode comprising an electroactive sulfur-containing material; and (iii) a liquid electrolyte interposed between the anode and the cathode.

Discharge and Charge Conditions

The term "cycle," as used herein, relates to a combined charge one-half cycle and a discharge one-half cycle, whereby the cell or battery takes in and stores electrical energy in a charge one-half cycle and releases electrical energy in a discharge one-half cycle.

The term "last half cycle," (LHC), as used herein, relates to the last half discharge cycle of the cell.

The term "charge capacity," as used herein, relates to the maximum charge measured in ampere hours (Ah), which a cell or battery is capable of achieving under defined charging conditions. The term "discharge capacity," as used herein, relates to the measured discharge of a cell or battery in ampere hours (Ah) under defined discharge conditions.

The term "cycle life," as used herein, relates to the number of cycles undergone by a cell or battery under defined charging and discharging conditions, until the discharge capacity of the cell or battery has fallen to one half of the initial discharge capacity or to some other predetermined discharge capacity.

The term "figure of merit," (FOM), as used herein, is calculated by dividing the accumulated discharge capacity to the end of cycle life in mAh by the theoretical capacity of lithium (3860 mAh/g of lithium) in the anode.

In one aspect of the present invention, a method is provided for increasing the cycle life of discharged lithium electrochemical cells, which cells comprise an anode comprising lithium, a cathode comprising an electroactive sulfur-containing material, and a liquid electrolyte, in which the charging method has one or more low rate charging steps followed by one or more high rate charging steps. The sum of the charge provided in these low and high rate charging steps is greater than the discharge capacity of the cell measured in the previous discharge half cycle.

In one embodiment of the present invention, the charging rate for the initial low rate charge steps is less than 0.2 mA/cm$^2$. In one embodiment, the charging rate for the initial low rate charge steps is from 0.03 mA/cm$^2$ to about 0.15 mA/cm$^2$. Preferably, the initial low charge rate is from about 0.06 mA/cm$^2$ to about 0.13 mA/cm$^2$.

In one embodiment of the present invention, the charging rate for the subsequent high rate charge steps is greater than 0.20 mA/cm$^2$. In one embodiment, the charging rate for the subsequent high rate charge steps is greater than 0.20 mA/cm$^2$ to about 0.75 mA/cm$^2$. Preferably, the subsequent high charge rate is from about 0.25 mA/cm$^2$ to about 0.50 mA/cm$^2$.

Although excellent results may be obtained from a charging method with one initial low rate charge step and one subsequent high rate charge step, it may be desirable in some embodiments to use more than one charge step in either or both the low and high charge rates. The initial low rate charge step may comprise two or more sub-steps of less than 0.2 mA/cm$^2$, preferably two to four sub-steps. The subsequent high rate charge step may comprise two or more sub-steps of greater than 0.2 mA/cm$^2$, preferably two to four sub-steps. In such cases, each charge step, low or high, should preferably be at a higher rate than the previous step. Suitable ratios of the average charge rates of the initial low rate charge sub-steps and the average charge rates of the subsequent high rate charge sub-steps may vary widely, such as, for example, from 1:1.5 to about 1:10.

The sum of the charge provided by the low rate charging steps and the high rate charging steps of the present invention is greater than the discharge capacity of the cell or battery in the last half discharge cycle, LHC. In other words an overcharge is used in the charging process. The term "overcharge," as used herein, pertains to the ratio, expressed as a percentage, between the overall charge provided to the cell during charging and the discharge capacity of the LHC. Suitable overcharge levels may vary widely, such as, for example, from 105% to 200%. Preferred overcharge levels are from 105% to 180%. More preferred overcharge levels are from 105% to 120%. For example, a cell having a discharge capacity of 800 mAh from the last half discharge cycle, LHC, would be provided with greater than a charge of 800 mAh, for example, such as 880 mAh if an overcharge level of 110% was chosen.

In one embodiment of the present invention, the one or more low rate charge steps are employed until the cell voltage reaches from 2.1 to 2.3 V. Preferably, the one or more low rate charge steps are employed until the cell voltage reaches from 2.2 to 2.3 V. More preferably, the one or more low rate charge steps are employed until the cell voltage reaches at least 2.3 V but not more than 2.35 V. The one or more low rate steps are followed by one or more high rate charging steps until the cell voltage is at least 2.4 V, or until an overcharge level of 105% to 150% is reached, and, more preferably, until an overcharge level of 105% to 115% is reached.

In one embodiment, the charge provided from the initial low rate charge steps is from 20% to 80% of the overall charge provided to the cell by the charging methods of this invention. In one embodiment, the charge provided from the subsequent high rate step is from 20% to 80% of the overall charge provided to the cell by the charging methods of this invention. In a preferred embodiment, the charge provided from the initial low rate charge steps is from 25% to 50% of the overall charge provided, and the charge provided by the subsequent high rate steps is from 50% to 75% of the overall charge provided.

The choice of charge regime in any specific situation will depend on the relative importance of requirements such as FOM, cycle life, and the overall charge time desired. For example, for the charge charging regimes of Example 7 and Example 8, when the discharge capacity of the LHC of a cell is 695 mAh, the value for 115% LHC is 800 mAh (695× 115%) but different charging time will be required for the different charging regimes. In Example 7, 75% of the charge is provided at a current of 100 mA and the remainder at 300 mA, giving a total charge time of approximately 6.6 hours. In Example 8, 25% of the charge is provided at a current of 50 mA and the remainder at 183 mA, giving a total charge time of approximately 7.3 hours. This 10% increase in charging time results in only about a 1% increase in FOM at the cut off capacity of 600 mAh. If much shorter charge times are desirable, lower FOM or cycle life may result. Nevertheless, the methods of the present invention provide shorter overall charge times for any desired cycle life or FOM than single step or taper charge methods.

Discharge of cells at low rates typically leads to lower cycle life than for cells discharged at higher rates. For example, Saito et al. report, in *J. Power Sources*, 1998, 72, 111–117, that for Li/V$_2$O$_5$—P$_2$O$_5$ cells low rate discharging (0.5 mA/cm$^2$) results in much lower cycle life than high rate discharging (5.0 mA/cm$^2$). As shown in Table 1 for Comparative Example 3, which has a discharge rate of 0.63 mA/cm$^2$, and for Comparative Example 4, which has a discharge rate of 0.19 mA/cm$^2$, a much greater capacity is achieved at the higher discharge rate, as measured by the FOM of 19.2 for Comparative Example 3 vs. the FOM of 9.0 for Comparative Example 4.

The charge regimes in the methods of the present invention are suitable for cells discharged under both high and low rates. The charge regimes described herein are particularly suitable for cells discharged at low rates. For example, electronic equipment when operated in a stand-by mode draws current, i.e. discharges, at low rates, such as from 0.03 mA/cm$^2$ to about 0.1 mA/cm$^2$. The charge regimes of the present invention are particularly suitable for cells discharged at low rates, such as from about 0.025 mA/cm$^2$ to about 0.25 mA/cm$^2$.

Another benefit of the methods of the present invention is the reduction in the swelling of cells, such as prismatic cells. The methods of this invention show reduced swelling at end of life and even more significant reduction in swelling per cycle in comparison to single step or taper charge regimes, as shown in Table 3.

A further benefit of the methods of the present invention is in cell or battery safety. For example, AA batteries charged in a single low rate step failed a hot box safety test at 130° C. for 60 minutes whereas the same batteries charged in a two step process of this invention passed the same hot box safety test.

While not wishing to be bound by any theory, discharge of cells comprising electroactive sulfur-containing cathodes and anodes comprising lithium, especially at low rates, may result in some or all of the following; severe lithium passivation on the lithium surface, blocking of conductive pathways, such as conductive carbons, in the electroactive sulfur-containing cathode, formation of electrochemically inactive crystal phases of lithium sulfides, passivation of the cathode surface by insoluble products, and blocking of the separator by insoluble products. The reversal of the reactions leading to these may be slow since they involve the participation of solid-state products. Charging at low current facilitates the first step oxidation in which insoluble sulfides from the cathode, such as Li$_2$S and Li$_2$S$_2$, are transformed into soluble sulfides. Once soluble polysulfides are formed, higher current is preferable to speed charging and to increase charge efficiency of the lithium-sulfur electrochemistry. At the same time at the lithium anode in the charging process, low charge current deposits lithium more homogeneously, which can provide multiple nucleation centers for further lithium deposition at subsequent high current rates, and smooth plating morphology.

Inasmuch as the solubility of lithium sulfides and the surface morphology of lithium vary significantly from one electrolyte to another, the most effective charge regime may depend on the solvent and ionic salt components of the electrolyte of an electrochemical cell. In other words, the charging regimes, for example, initial charge rates, subsequent charge rates, and amount of overcharge, to achieve maximum cycle life or FOM may depend on the choice of the electrolyte system.

Cathodes

The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials, include, but are not limited to, elemental sulfur and organic materials comprising both sulfur atoms and carbon atoms, which may or may not be polymeric. Suitable organic materials include those further comprising heteroatoms, conductive polymer segments, composites and conductive polymers.

In one embodiment, the sulfur-containing material, in its oxidized form, comprises a sulfur-containing polymer comprising a polysulfide moiety, S$_m$, selected from the group consisting of covalent —S$_m$— moieties, ionic —S$_m^-$ moieties, and ionic S$_m^{2-}$ moieties, wherein m is an integer equal to or greater than 3. In one embodiment, m of the polysulfide moiety, S$_m$, of the sulfur-containing polymer is an integer equal to or greater than 6. In one embodiment, m of the polysulfide moiety, S$_m$, of the sulfur-containing polymer is an integer equal to or greater than 8. In one embodiment, the sulfur-containing polymer has a polymer backbone chain and the polysulfide moiety, S$_m$, is covalently bonded by one or both of its terminal sulfur atoms on a side group to the polymer backbone chain. In one embodiment, the sulfur-containing polymer has a polymer backbone chain and the polysulfide moiety, S$_m$, is incorporated into the polymer backbone chain by covalent bonding of the terminal sulfur atoms of the polysulfide moiety.

In one embodiment, the electroactive sulfur-containing material comprises elemental sulfur. In one embodiment, the electroactive sulfur-containing material comprises a mixture of elemental sulfur and a sulfur-containing polymer.

In one embodiment, the electroactive sulfur-containing material comprises greater than 50% by weight of sulfur. In a preferred embodiment, the electroactive sulfur-containing material comprises greater than 75% by weight of sulfur. In a more preferred embodiment, the electroactive sulfur-containing material comprises greater than 90% by weight of sulfur.

The nature of the electroactive sulfur-containing materials useful in the practice of this invention may vary widely, as known in the art. Further examples of suitable electroactive sulfur-containing materials include, but are not limited to;

(a) an electroactive polycarbon-sulfide material, which in its oxidized state, is of the general formula:

wherein x ranges from greater than 2.5 to about 50, and n is an integer equal to or greater than to 2, as described in U.S. Pat. Nos. 5,601,947 and 5,690,702 to Skotheim et al.; and which, in its oxidized state, comprises one or more of the polysulfur moieties:

wherein m, the same or different at each occurrence, is an integer and is greater than 2, and y, the same or different at each occurrence, is an integer and is equal to or greater than 1.

(b) an electroactive polyacetylene co-polysulfur material, which in its oxidized state, is of the general formula:

wherein x ranges from greater than 1 to about 100, and n is an integer equal to or greater than 2, as described in U.S. Pat. No. 5,529,860 to Skotheim et al.; and which, in its oxidized state, comprises one or more of the moieties:

and wherein m, the same or different at each occurrence, is greater than 2; and, (c) an electroactive, highly crosslinked organic polymer, which polymer comprises polymeric segments of the formula;

wherein:
Q denotes a carbocyclic repeat unit comprising a carbocycle having from 3 to 12 ring carbon atoms;
S denotes a sulfur atom;
m is the number of sulfur atoms in a given polysulfide linkage, is an integer from 3 to 10, and is the same or different at each occurrence;
n denotes the number of crosslinking polysulfide linkages, is an integer from 1 to 20, and is the same or different at each occurrence; and
p is an integer greater than 1; as described in U.S. patent application Ser. No. 08/995,122 now U.S. Pat. No. 6,201,100 to Gorkovenko et al. of the common assignee.

Other suitable electroactive sulfur-containing materials comprising polysulfide linkages include, but are not limited to, those described in U.S. Pat. No. 4,664,991 to Perichaud et al. and in U.S. Pat. Nos. 5,723,230, 5,783,330, 5,792,575 and 5,882,819 to Naoi et al.

Still further examples of electroactive sulfur-containing materials include those comprising disulfide groups as described, for example, in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

The electroactive sulfur-containing cathodes of the present invention may further comprise electroactive metal chalcogenides, electroactive conductive polymers, and combinations thereof.

The cathodes of the present invention may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, carbon fabrics, metal mesh, and electrically conductive polymers. The amount of conductive filler, if present, is preferably in the range of 2 to 30% by weight.

The cathodes of the present invention may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (Teflon®), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, is preferably in the range of 2 to 30% by weight.

The cathodes of the present invention may further comprise a current collector. These current collectors are useful in efficiently collecting the electrical current generated throughout the cathodes and in providing an efficient surface for attachment of the electrical contacts leading to the external circuit as well as a support for the cathode. Examples of useful current collectors include, but are not limited to, those selected from the group consisting of metallized plastic films, metal foils, metal grids, expanded metal grids, metal mesh, metal wool, woven carbon fabric, woven carbon mesh, non-woven carbon mesh, and carbon felt.

Cathodes of the present invention may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode.

Examples of suitable liquid media for the preparation of cathodes of the present invention include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to substrates by any of a variety of well-known coating methods known in the art and then dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of methods known in the art. Examples of suitable methods for the removal of liquid from the mixture include, but are not limited to, hot air convection, heat, infrared radiation, flowing gases, vacuum, reduced pressure, extraction, and by simply air drying.

The method of preparing the cathodes of the present invention may further comprise heating the electroactive sulfur-containing material to a temperature above its melting point and then resolidifying the melted electroactive sulfur-containing material to form a cathode active layer having redistributed sulfur-containing material of higher volumetric density than before the melting process.

Anodes

Suitable anode active materials, comprising lithium, for the anodes of the present invention include, but are not limited to, lithium metal, such as lithium foil and lithium deposited on to a plastic substrate, and lithium alloys, such as lithium-aluminum alloys and lithium-tin alloys.

Electrolytes

The electrolytes used in electrochemical cells function as a medium for the storage and transport of ions, and in the special case of solid electrolytes and gel electrolytes, these materials may additionally function as separator materials between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials or polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes, as are known in the art. Examples of non-aqueous electrolytes for lithium batteries are described by Dominey in *Lithium Batteries, New Materials, Developments and Perspectives*, Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives*, Chapter 3, pp. 93–136, Elsevier, Amsterdam (1994).

Examples of useful liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

These liquid electrolyte solvents are themselves useful as plasticizers for gel polymer electrolytes. Examples of useful gel polymer electrolytes include, but are not limited to, those comprising polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION™ resins), polydivinyl polyethylene glycols, polyethylene glycol diacrylates, poly- ethylene glycol dimethacrylates, derivatives of the foregoing, copolymers of the foregoing, crosslinked and network structures of the foregoing, and blends of the foregoing.

Examples of useful solid polymer electrolytes include, but are not limited to, those comprising polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. These solid polymer electrolytes may contain a liquid electrolyte solvent, typically at a level of less than 20% by weight of the total electrolyte.

Ionic electrolyte salts are added to increase the ionic conductivity. Examples of ionic electrolyte salts for use in the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$.

and the like. Other electrolyte salts useful in the practice of this invention include lithium polysulfides (Li$_2$S$_x$), and lithium salts of organic ionic polysulfides (LiS$_x$R)$_z$, where x is an integer from 1 to 20, z is an integer from 1 to 3, and R is an organic group, and those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, LiC(SO$_2$CF$_3$)$_3$, (LiS$_x$)$_z$R, and Li$_2$S$_x$, where x is an integer from 1 to 20, z is an integer from 1 to 3, and R is an organic group.

Separators

The electrochemical cells of the present invention may further comprise a separator interposed between the cathode and anode. Typically, the separator is a solid non-conductive or insulative material which separates or insulates the anode and the cathode from each other and which permits the transport of ions between the anode and the cathode.

The pores of the separator may be partially or substantially filled with electrolyte. Separators may be supplied as porous free standing films which are interleaved with the anodes and the cathodes in the fabrication of electric current producing cells. Alternatively, the porous separator layer may be applied directly to the surface of one of the electrodes, for example, as described in U.S. patent application Ser. No. 08/995,089 to Carlson et al of the common assignee and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in PCT Publication No. WO 99/33125, by Carlson et al. of the common assignee. Solid polymer electrolytes and gel polymer electrolytes may also function as a separator in addition to their electrolyte function.

In one embodiment, the solid porous separator is a porous polyolefin separator. In one embodiment, the solid porous separator comprises a microporous xerogel layer, such as, for example, a microporous pseudo-boehmite layer.

Cells or batteries of the present invention may be made in a variety of sizes and configurations which are known to those skilled in the art. These battery design configurations include, but are not limited to, planar, prismatic, jelly roll, w-fold, stacked and the like. Although the methods of the present invention are particularly suitable for use with thin film electrodes, they may nevertheless be beneficial in thick film design. Alternatively, designs incorporating both low and high surface area regions, as described in U.S. Pat. Nos. 5,935,724 and 5,935,728 to Spillman et al., can be incorporated into jellyroll and other configurations.

In thin film electrodes when configured into prismatic designs it is important that the electrodes possess dimensional stability. For example, it is important that there is minimal swelling in the cells as the number of cycles increases. It has been found that the methods of the present invention lead to reduced swelling during cycling of cells, as shown in Table 3. This behavior is particularly beneficial when long cycle life is also achieved. The swelling in the cells is typically a result of dimensional changes in the electrodes and not a result of the formation of gases from traces of water in the cell components reacting with metallic lithium or from the formation of gaseous species, such as low boiling hydrocarbons, from reactions of lithium with electrolyte solvents.

EXAMPLES

Several embodiments of the present invention are described in the following examples, which are offered by way of illustration and not by way of limitation.

Example 1

Cells were prepared by the following method.

A cathode was prepared by coating a mixture of 75 parts of elemental sulfur (available from Aldrich Chemical Company, Milwaukee, Wis.), 15 parts of a conductive carbon pigment PRINTEX XE-2 (a trademark for a carbon pigment available from Degussa Corporation, Akron, Ohio), and 10 parts of PYROGRAF-III (a tradename for carbon filaments available from Applied Sciences, Inc., Cedarville, Ohio) dispersed in isopropanol onto a 17 micron thick conductive carbon coated aluminum foil substrate (Product No. 60303 available from Rexam Graphics, South Hadley, Mass.). After drying and calendering, the coated cathode active layer thickness was about 27 microns. The anode was lithium foil of about 50 microns in thickness. The electrolyte was a 0.75 M solution of lithium bis (trifluoromethylsulfonyl) imide, (lithium imide available from 3M Corporation, St. Paul, Minn.) in a 50:50 volume ratio mixture of 1,3-dioxolane and dimethoxyethane. The porous separator used was 16 micron E25 SETELA (a trademark for a polyolefin separator available from Tonen Chemical Corporation, Tokyo, Japan, and also available from Mobil Chemical Company, Films Division, Pittsford, N.Y.).

The above components were combined into a layered structure of cathode/separator/anode, which was wound and compressed, with the liquid electrolyte filling the void areas of the separator and cathode to form prismatic cells with an electrode area of about 800 cm$^2$.

Examples 2–12 and Comparative Examples 1–7

The cells prepared as described in Example 1 were discharged to 1.5 V at discharge currents of 500 mA, 150 mA or 50 mA. Typically the initial discharge capacity was approximately 1100 mAh and the discharge capacity at the 5$^{th}$ cycle was approximately 800 to 850 mAh. The results for cells charged by the multi-step methods of the present invention are illustrated in Table 2 and the results of comparative cells charged in a single step are illustrated in Table 1.

In Comparative Example 1, a taper charge method was used to charge the cell in which the cell was charged at a high rate of 200 mA (0.25 mA/cm$^2$) to a voltage of 2.3 V and then was maintained at this voltage for 5 hours during which time the charge current decreases to low levels, such as 50 mA.

Comparative Examples 1–3 illustrate single step charge methods at the high rates of 200 mA (0.25 mA/cm$^2$) of cells discharged at 500 mA (0.63 mA/cm$^2$). Comparative Examples 4–6 illustrate single step charge methods at charge currents of 150 mA or 200 mA for cells discharged at the low rate of 150 mA (0.188 mA/cm$^2$). Comparative Example 7 illustrates cells charged in a single step method at a rate of 150 mA and discharged at the low ate of 50 mA (0.063 mA/cm$^2$).

TABLE 1

Cell Performance vs. Discharge-Charge Conditions

| Comparative Example No. | Discharge Current | Charge Current | Charge Type | FOM | Cut Off Capacity |
|---|---|---|---|---|---|
| Example 1 | 500 mA | 200 mA | Taper, 5 hr | 30 | 300 mAh |
| Example 2 | 500 mA | 200 mA | 105% LHC | 20.8 | 300 mAh |
| Example 3 | 500 mA | 200 mA | 110% LHC | 19.2 | 300 mAh |
| Example 4 | 150 mA | 200 mA | 120% LHC | 9.0 | 300 mAh |
| Example 5 | 150 mA | 150 mA | 110% LHC | 12.5 | 300 mAh |
| Example 6 | 150 mA | 150 mA | 110% LHC | 10.9 | 500 mAh |
| Example 7 | 50 mA | 150 mA | 110% LHC | 3.9 | 600 mAh |

TABLE 2

Cell Performance vs. Discharge-Charge Conditions

| Example No. | Discharge Current | Charge Current (% of Overall Charge) | Charge Type | FOM | Cut Off Capacity |
|---|---|---|---|---|---|
| Example 2 | 150 mA | 100 mA (55%), 200 mA | 110% LHC | 24.5 | 500 mAh |
| Example 3 | 150 mA | 100 mA (75%), 300 mA | 200% LHC | 16.3 | 600 mAh |
| Example 4 | 150 mA | 100 mA (25%), 167 mA | 200% LHC | 18.0 | 600 mAh |
| Example 5 | 150 mA | 75 mA (25%), 175 mA | 175% LHC | 19.1 | 600 mAh |
| Example 6 | 150 mA | 100 mA (75%), 300 mA | 115% LHC | 29.5 | 550 mAh |
| Example 7 | 150 mA | 100 mA (75%), 300 mA | 115% LHC | 28.5 | 600 mAh |
| Example 8 | 150 mA | 50 mA (25%), 183 mA | 115% LHC | 28.8 | 600 mAh |
| Example 9 | 150 mA | 50 mA (75%), 450 mA | 115% LHC | 19.4 | 600 mAh |
| Example 10 | 150 mA | 50 mA (50%), 250 mA | 110% LHC | 20.8 | 600 mAh |
| Example 11 | 50 mA | 100 mA (55%), 200 mA | 110% LHC | 7.1 | 600 mAh |
| Example 12 | 50 mA | 50 mA (86%), 450 mA | 110% LHC | 6.8 | 600 mAh |

Examples 2–12 illustrate cells charged by the multi-step methods of the present invention following discharge at low rates of 150 mA or 50 mA.

Figure 1:
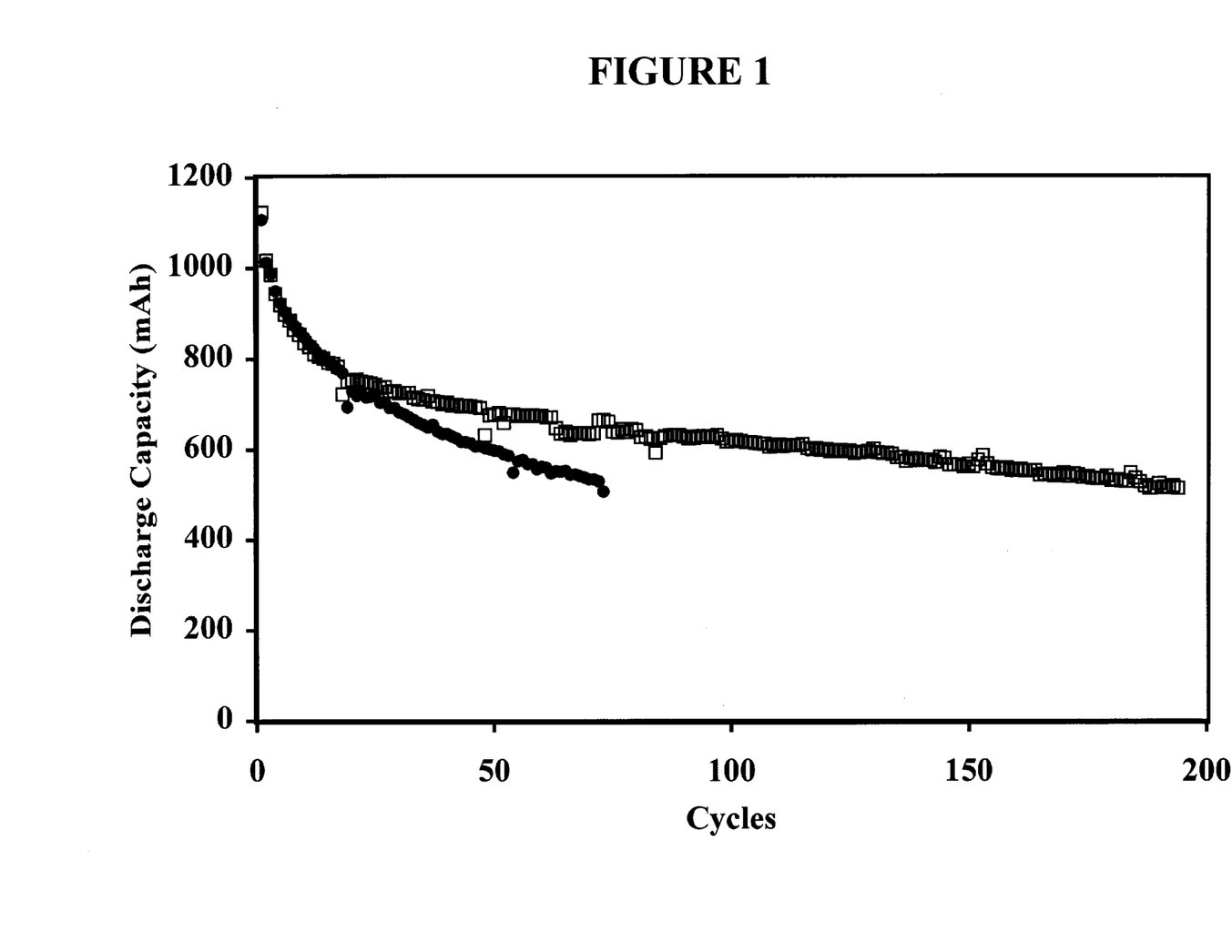
FIG. 1 shows the discharge capacity vs. cycle number for cells of Comparative Example 6 (•), discharged at 150 mA, and charged in one step at 150 mA, and cells of Example 2 (□), discharged at 150 mA, and charged in two steps at 100 mA and 200 mA.
Figure 2:
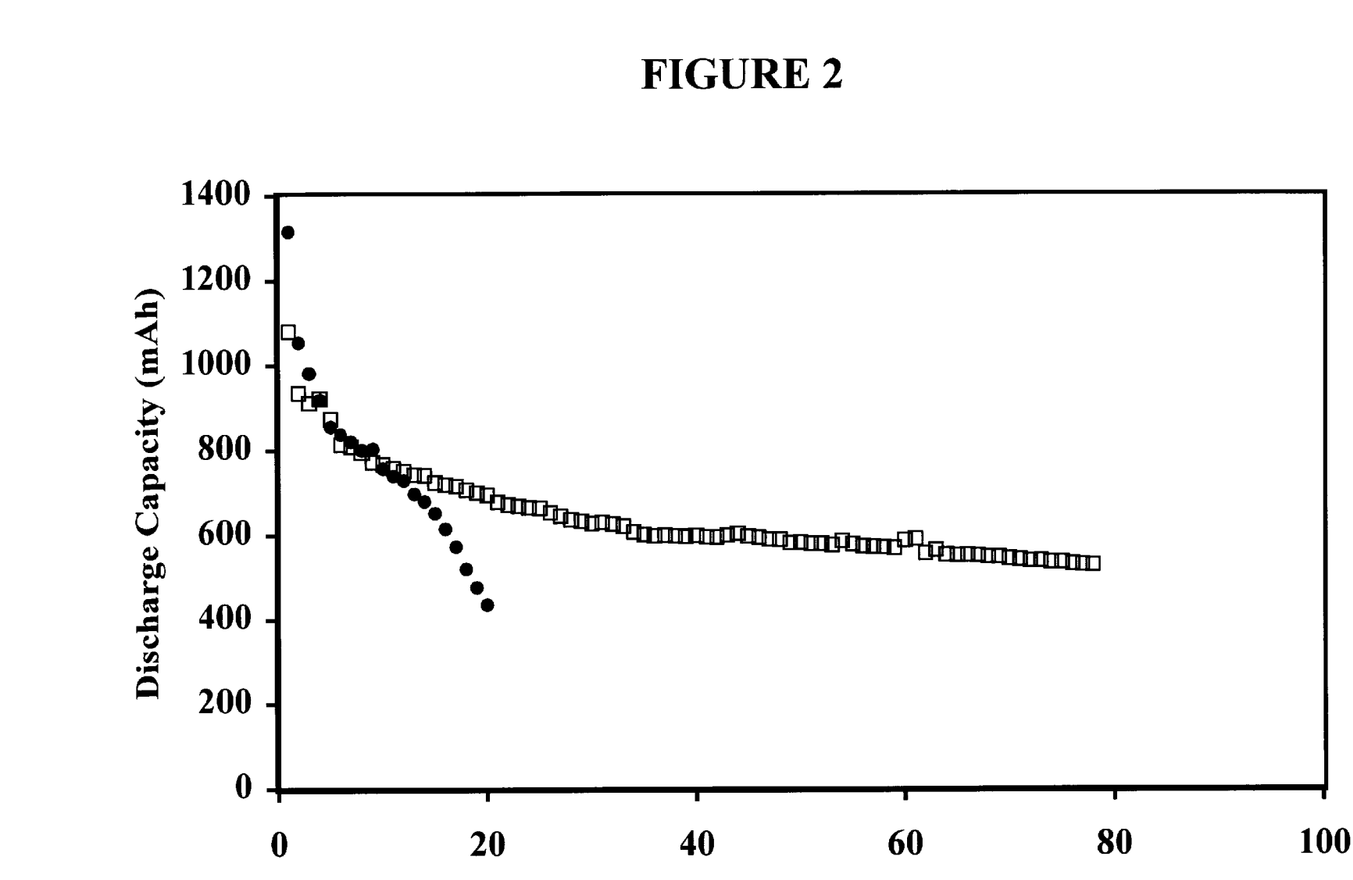
FIG. 2 shows the discharge capacity vs. cycle number for cells of Comparative Example 7 (•), discharged at 50 mA, and charged in one step at 150 mA, and cells of Example 12 (□), discharged at 50 mA, and charged in two steps at 50 mA and 450 mA.

Examples 2–12 show that the multi-step charge methods provide much longer cycle life (FOM) compared with a single step charge for cells discharged at a low rate. For example, Example 2 provides a cycle life more than twice that of Comparative Example 6 at the same capacity cutoff and overcharge, as indicated by the FOM of 24.5 vs. 10.9, as illustrated in FIG. 1. A comparison of Example 3 with Example 7 shows that although a two step charge method with high overcharge, 200% LHC, provides good cycle life a lower overcharge of 115% LHC provides higher cycle life. As illustrated in FIG. 2 for cells discharged at a low rate of 50 mA, the two step charge of Example 12 compared with single step charge of Comparative Example 7 provides a cycle life of almost 70% longer as shown by the FOM of 6.8 vs. 3.9.

Example 13

The thickness of the prismatic cells of Example 2, Example 8 and Comparative Example 6 were measured prior to initial discharge and after the discharge at the cut off capacity. Swelling is the percentage increase in thickness of the cells calculated by dividing the initial thickness into the final thickness.

TABLE 3

Swelling vs. Discharge-Charge Conditions

| Example No. | Cut Off Capacity | Total Swelling | Swelling/FOM |
|---|---|---|---|
| Comparative Example 6 | 500 mAh | 54% | 4.2% |
| Example 2 | 500 mAh | 39.4% | 1.5% |
| Example 8 | 600 mAh | 27% | 0.9% |

The data in Table 3 show that the multi-step charge methods of the present invention result in less swelling of the prismatic cells. For example, Comparative Example 6 shows an undesirable greater total swelling at the 500 mAh cutoff compared with Example 2. When compared as the swelling on each cycle (or FOM), the benefit of the two step method is even greater.

Example 14

A cathode was prepared by coating a mixture of 75 parts of elemental sulfur, 20 parts of a conductive carbon pigment PRINTEX XE-2, and 5 parts of PYROGRAF-III, dispersed in isopropanol onto a 17 micron thick conductive carbon coated aluminum foil substrate. After drying and calendering, the coated cathode active layer thickness was about 27 microns. The anode was lithium foil of about 20 microns in thickness. The electrolyte was a 0.75 M solution of lithium bis (trifluoromethylsulfonyl) imide in a 50:50 volume ratio mixture of 1,3-dioxolane and dimethoxyethane. The porous separator used was 16 micron E25 SETELA.

Wound AA cells were assembled with the above cathodes, anodes, and separator. The electrode jelly roll was inserted into stainless-steel cans with a single line coining vent on the can base and sealed. The cell vent was designed to relieve the internal pressure of the cell when the internal pressure is in the range of 600 to 800 psi. The AA cells were filled with the liquid electrolyte solutions using a vacuum back fill technique.

The cells after undergoing five discharge and charge cycles were subjected to the hot box safety test at 130° C. for 60 minutes. The hot box was a closed oven with thermocouples to monitor the temperature of the oven and of the cell at the vent over the time of the test.

One set of five cells was discharged at a current of 250 mA and charged in two steps; the first charge step was 150 mA to a cell voltage of 2.3 V and the second charge step was 300 mA to 2.8 V. This set passed the 130° C. hot box safety test without the cell temperature exceeding the 130° C. temperature of the oven.

One set of five cells was discharged at a current of 250 mA and charged in a single step of 150 mA to a cell voltage of 2.8 V. This set failed the 130° C. hot box safety test by venting with fire.

Example 15

AA cells were prepared by the procedure of Example 14.

One set of six cells was discharged at a current of 250 mA and charged in two steps; the first charge step was 150 mA to a cell voltage of 2.3 V and the second charge step was 300 mA to 2.8 V for a total of 5 cycles. After these 5 cycles this set of cells was discharged at GSM conditions with 2000 mA×0.6 mS and 150 mA×4.4 mS pulses and continued to be charged with the two step charge. The cells continued to maintain the same discharge capacity with little fade for more than 20 cycles.

One set of six cells was discharged at a current of 250 mA and charged in a single step of 150 mA to a cell voltage of 2.8 V for a total of 5 cycles. After these 5 cycles this set of cells was discharged at GSM conditions with 2000 mA×0.6 mS and 150 mA×4.4 mS pulses and continued to be charged with the single step charge. The cells showed essentially no discharge capacity under the GSM discharge conditions on the sixth and subsequent cycles, in contrast to the cells charged in the two step mode.

While the invention has been described in detail and with reference to specific embodiments thereof, it will be apparent to one skilled in the art that various changes and modifications can be made without departing from the spirit and scope thereof.

What is claimed is:

1. A method of increasing the cycle life of a lithium electrochemical cell, wherein said method comprises the steps of:
   (a) discharging said cell at an overall rate of less than 0.5 mA/cm$^2$;
   (b) charging said cell at an initial low charge rate of less than 0.2 mA/cm$^2$ to a cell voltage in the range of 2.1 to 2.3 V; and
   (c) subsequently charging said cell at a high charge rate of greater than 0.2 mA/cm$^2$ to a cell voltage of at least 2.4 V;
   wherein said cell comprises:
   (i) an anode comprising lithium;
   (ii) a cathode comprising an electroactive sulfur-containing material; and
   (iii) a liquid electrolyte interposed between said anode and said cathode.

2. The method of claim 1, wherein the low charge rate in the initial charging step (b) is from 0.03 mA/cm$^2$ to 0.15 mA/cm$^2$, and the high charge rate in the subsequent charging step (c) is from greater than 0.20 mA/cm$^2$ to 0.75 mA/cm$^2$.

3. The method of claim 1, wherein the initial low rate charging step (b) comprises two or more sub-steps of less than 0.2 mA/cm$^2$ in a sequence of increasing charge rate.

4. The method of claim 1, wherein the subsequent high rate charging step (c) comprises two or more sub-steps of greater than 0.2 mA/cm$^2$ in a sequence of increasing charge rate.

5. The method of claim 1, wherein said cell is charged to a voltage in the range of 2.2 to 2.3 V in said initial charging step (b).

6. The method of claim 1, wherein the combined sum of the charge provided in said initial charging step (b) and said subsequent charging step (c) is from 105% to 180% of the discharge capacity of the last half discharge cycle.

7. The method of claim 1, wherein the combined sum of the charge provided in said initial charge step (b) and said subsequent charging step (c) is from 105% to 120% of the discharge capacity of the last half discharge cycle.

8. The method of claim 1, wherein the overall discharge rate of said cell is from 0.025 mA/cm$^2$ to 0.25 mA/cm$^2$.

9. The method of claim 8, wherein the charge rate in said initial charging step is from 0.03 mA/cm$^2$ to 0.15 mA/cm$^2$ and the charge rate in said subsequent charging step is more than 0.20 mA/cm$^2$ to 0.75 mA/cm$^2$.

10. The method of claim 1, wherein said electroactive sulfur-containing material comprises elemental sulfur.

11. The method of claim 1, wherein said electroactive sulfur-containing material, in its oxidized state, comprises one or more polysulfide moieties, —$S_m$—, where m is an integer equal to or greater than 3.

12. The method of claim 1, wherein said electroactive sulfur-containing material, in its oxidized state, comprises one or more polysulfide moieties, —$S_m^-$, where m is an integer equal to or greater than 3.

13. The method of claim 1, wherein said electroactive sulfur-containing material, in its oxidized state, comprises one or more polysulfide moieties, $S_m^{2-}$, where m is an integer equal to or greater than 3.

14. The method of claim 1, wherein said electroactive sulfur-containing material, in its oxidized state, is of the general formula wherein x ranges from greater than 2.5 to about 50, and n is an integer equal to or greater than to 2.

15. The method of claim 1, wherein said electroactive sulfur-containing material, in its oxidized state, comprises one or more of the polysulfur moieties:

wherein m, the same or different at each occurrence, is an integer and is greater than 2, and y, the same or different at each occurrence, is an integer and is equal to or greater than 1.

16. The method of claim 1, wherein said electroactive sulfur-containing material, in its oxidized state, comprises one or more of the moieties:

wherein m is the same or different at each occurrence and is greater than 2.

17. The method of claim 1, wherein said electroactive sulfur-containing material is a polymer comprising polymeric segments of the formula:

wherein:
   Q denotes a carbocyclic repeat unit comprising a carbocycle having from 3 to 12 ring carbon atoms;

S denotes a sulfur atom;

m is the number of sulfur atoms in a given polysulfide linkage, is an integer from 3 to 10, and is the same or different at each occurrence;

n denotes the number of crosslinking polysulfide linkages, is an integer from 1 to 20, and is the same or different at each occurrence; and p is an integer greater than 1.

18. The method of claim 1, wherein said electroactive sulfur-containing material comprises greater than 50% by weight of sulfur.

19. The method of claim 1, wherein said electroactive sulfur-containing material comprises greater than 75% by weight of sulfur.

20. The method of claim 1, wherein said electroactive sulfur-containing material comprises greater than 90% by weight of sulfur.

21. The method of claim 1, wherein said anode comprises lithium metal.

22. The method of claim 1, wherein said liquid electrolyte comprises:
(i) one or more lithium salts; and
(ii) one or more non-aqueous solvents.

23. The method of claim 22, wherein said one or more lithium salts are selected from the group consisting of LiBr, LiI, LiSCN, $LiBF_4$, $LiPF_6$, $LiAsF_6$, $LiSO_3CF_3$, $LiN(SO_2CF_3)_2$, $LiC(SO_2CF_3)_3$, $(LiS_x)_zR$, and $Li_2S_x$, where x is an integer from 1 to 20, z is an integer from 1 to 3, and R is an organic group.

24. The method of claim 22, wherein said one or more non-aqueous solvents are selected from the group consisting of ethers, cyclic ethers, polyethers, esters, sulfones, and sulfolanes.

* * * * *